US006020051A

United States Patent [19]

Ebisch et al.

[11] Patent Number: 6,020,051

[45] Date of Patent: Feb. 1, 2000

[54] PHOTOGRAPHIC BASE PAPER WITH GOLD PRINTING ON BACK SIDE

[75] Inventors: Rolf Ebisch, Osnabrück; Hans-Ulrich Berner, Hilter, both of Germany

[73] Assignee: Felix Schoeller jr. Foto-und Specialpapiere GmbH &Co. KG, Osnabruck, Germany

[21] Appl. No.: 09/016,251

[22] Filed: Jan. 30, 1998

[30] Foreign Application Priority Data

Feb. 8, 1997 [DE] Germany .......................... 197 04 819

[51] Int. Cl.[7] .......................... B23B 3/00

[52] U.S. Cl. .......................... 428/211; 428/195; 428/206; 428/207; 428/516; 428/522

[58] Field of Search .......................... 428/195, 206, 428/207, 211, 516, 522; 106/20, 31.65, 31.9; 430/307; 355/1

[56] References Cited

U.S. PATENT DOCUMENTS

| | | | |
|---|---|---|---|
| 5,702,518 | 12/1997 | Vogt et al. | 106/439 |
| 5,741,355 | 4/1998 | Yamamoto et al. | 106/417 |

FOREIGN PATENT DOCUMENTS

| | | |
|---|---|---|
| 3150492 | of 0000 | Germany . |
| 1-77539 | 3/1989 | Japan . |
| 5-117569 | 5/1993 | Japan . |

OTHER PUBLICATIONS

Data Base WPI, Section Ch, Week 9339, Derwent Publications Ltd., London, GB; Class A82, AN 93–309632, XP002066970 & JP 05 222 700 A (Tokushu Seishi KK); Aug. 31, 1993.

Database WPI, Section Ch, Week 8652, Derwent Publications Ltd., London, GB; Class A89, AN 86–343947, XP002066971 & JP 61 259 246 A (Fuji Photo Film Co Ltd); Nov. 17, 1986.

*Primary Examiner*—Bruce H. Hess
*Assistant Examiner*—Michael E. Grendzynski
*Attorney, Agent, or Firm*—Cook, Alex, McFarron, Manzo, Cummings & Mehler, Ltd.

[57] ABSTRACT

A polyolefin-coated photographic base paper that has a shiny gold printing on the back side, prepared with a printing ink that contains an interference pigment and a water-soluble and/or a water-dispersible binder.

11 Claims, No Drawings

PHOTOGRAPHIC BASE PAPER WITH GOLD PRINTING ON BACK SIDE

BACKGROUND, SUMMARY AND DESCRIPTION OF THE INVENTION

The invention relates to a base paper coated with a polyolefin resin on both sides for photographic emulsion support material that has a gold colored glossy printing on the back side (logo print).

The back side is the surface of the base paper that is opposite the front side that later holds the image.

Usually the papers used as support materials for photosensitive emulsions, especially for color photography, are those that are coated on their surfaces, i.e., front and back sides, with polyolefin coatings. The polyolefin coating on both sides protects the base paper from penetration by developing, fixing and rinsing baths. The polyolefins can be polyethylenes like LDPE, LLDPE, HDPE, polypropylene or mixtures of those components.

Such photographic base papers have been described many times, for example in DE 37 16 269 C2.

The back side of such base paper is often printed with the usual gravure technology in order to mark it with various patterns or characters like logos. The inks needed fcr tne printing process must not be photographically active in view of the photosensitive emulsions to be applied later. It is also important that, on one hand, the inks adhere well to the raw paper and, on the other hand, the polyolefin layer adheres well to the printing ink. Thus, it is known from JP 02-154 252, for example, how to print the back side of a polyethylene-coated photographic base paper with a special black printing ink to give the printed places good adhesion to the polyethylene.

It proves especially difficult to print on the back side with a shiny or glossy gold ink. The pigments used for this purpose in conventional gravure printing are consistently bronze-based or aluminum-bronze-based. The use of these pigments therefore cannot be considered for photographic papers since the copper components contained in the bronze colors are photochemically active. Even with the polyolefin resin covering it is to be feared that copper ions will be washed out in the developer baths and will potentially have a photoactive effect.

For the reasons mentioned, a printing ink similar to gold developed on the basis of yellow pigments was used in the past. The characters printed with such ink are poorly legible, however, and they do not have the shiny effect desired.

Since the shiny gold printing ink should be water-based for technical safety and ecological reasons, their good adhesion to the raw paper and the adhesion of the polyolefin coating to the printing ink presents another problem with such aqueous inks, besides achieving the required color and shine properties.

The object of the invention is therefore to provide a photographic base paper whose back side has shiny or glossy gold-colored print which is produced in a regular gravure process using a water-based, shiny, gold ink that is not photochemically active and that has excellent adhesion properties both to the raw paper and to the polyolefin coating.

This object is achieved through the use of an ink that contains an interference pigment and a special water-soluble binder.

The effect of the interference pigments (shiny gold pigments, shiny metal pigments) is based on selective reflection of light beams.

Especially suited are mica-based pigments (modified mica particles), in which a core of mica particles having a platelike shape is provided with one or more metal oxide layers. This leads to the production of an interference effect in visible light. $TiO_2$ and/or $Fe_2O_3$ are particularly well suited for the coating of mica particles. Depending on the type of coating and its thickness, the color effects desired can be achieved.

In the printing ink according to the invention, the interference pigments may also be used in combination with conventional translucent color pigments.

For especially high brilliance, a pigment with a particle size distribution from roughly 5 to 80 $\mu$m is particularly well suited.

For the printing ink system according to the invention, water-soluble or water-dispersible binders such as polyvinyl alcohol, polyvinyl pyrrolidone, acrylate copolymers or styrene/butadiene copolymers are particularly well suited.

In a particular embodiment of the invention, polyvinyl alcohols are used. Polyvinyl alcohols with medium and low molecular masses are particularly well suited.

The content of the pigments described above in the invented printing ink is between 10% to 30% by weight, especially between 15% to 25% by weight, in relation to the aqueous ink solution. The quantity ratio of pigment to binder used is in the range of 1:1 to 8:1, but particularly in the range of 1.5:1 to 4:1.

The ink according to the invention may also contain other additives such as wetting agents.

Both the adhesion of the printing ink to the raw paper and the polyolefin adhesion to the printing according to the invention are excellent. Moreover, the legibility of the characters and patterns printed with the printing ink of the invention is not affected after potential coating of the back side of the polyethylene-coated base paper with other functional layers such as antistatic layers or anticurl layers, which is often the case when conventional printing inks are used.

This invention will be explained in greater detail using the following examples.

EXAMPLES 1 TO 6

A photographic raw paper with a basis weight of 130 $g/m^2$ was coated all over the back side with the printing inks shown in Table 1 in a step preceding the extrusion coating in the extruder and then extrusion-coated with polyethylene. The front side of the raw paper was coated with a mixture of a low-density polyethylene (LDPE, d=0.923 $g/cm^3$) and 15% by weight $TiO_2$ and the back with a pigment-free polyethylene mixture of low-density polyethylene (LDPE, d=0.915 $g/cm^3$) and a high-density polyethylene (HDPE, d=0.959 $g/cm^3$).

Then, the peeling force necessary for judging the adhesion of the printing ink both to the polyethylene and to the raw paper was measured on the base paper produced. The results are listed in Table 3.

TABLE 1

| Component | Composition, % wt. 1 | 2 | 3 | 4 | 5 | 6 |
|---|---|---|---|---|---|---|
| Acrylate copolymer | 12 | — | — | — | — | — |
| Styrene butadiene copolymer | — | 12 | — | — | — | — |
| Acrylate/styrene/acrylonitrile/butadiene copolymer | | | | | | 12 |
| Polyvinyl pyrrolidone | — | — | 12 | — | — | — |
| Polyvinyl alcohol 86% saponification | — | — | — | 12 | — | — |
| Polyvinyl alcohol 98% saponification | — | — | — | — | 8 | — |
| Pigment I | 20 | 20 | 20 | 20 | 20 | 20 |
| C mixture (36% IPA, 24% butanol, 40% $H_2O$) | 10 | 10 | 10 | 10 | 10 | 10 |
| Wetting agent, 1% in $H_2O/C_2H_5OH$ | 5 | 5 | 5 | 5 | 5 | 5 |
| Water (demineralized) | 53 | 53 | 53 | 53 | 57 | 53 |

EXAMPLES 7 TO 14

A photographic raw paper with a basis weight of 160 g/m$^2$ was coated on the back side in the same manner as shown in Example 1 with the printing inks shown in the table 2 and then extrusion-coated with polyethylene according to Example 1.

Then, the adhesion of the printing ink to both the polyethylene and the raw paper was evaluated on the base papers. The results are summarized in Table 3.

TABLE 2

| Components | Composition, % wt. 7 | 8 | 9 | 10 | 11 | 12 | 13 | 14 |
|---|---|---|---|---|---|---|---|---|
| Polyvinyl alcohol | 8 | 8 | 8 | — | 8 | 8 | 10 | — |
| Polyvinyl alcohol II | — | — | — | 5 | — | — | — | — |
| Polyvinyl alcohol III | — | — | — | — | — | — | — | 6.5 |
| Pigment I | 30 | 20 | 15 | 20 | — | — | 20 | 20 |
| Pigment II | — | — | — | — | 20 | — | — | — |
| Pigment III | — | — | — | — | — | 20 | — | — |
| C mixture (36% IPA, 24% butanol, 40% $H_2O$) | 10 | 10 | 10 | 10 | 10 | 10 | 10 | 10 |
| Wetting agent 1% in $H_2O/C_2H_5OH$ | 5 | 5 | 5 | 5 | 5 | 5 | 5 | 5 |
| Water (demineralized) | 47 | 57 | 62 | 60 | 57 | 57 | 55 | 58.5 |

COMPARATIVE EXAMPLES V1 AND V2

A photographic raw paper was coated with a printing ink as in Example 1, using a polyvinyl acetate (V1) and polyethylene glycol (V2) as binders.

Adhesion Test

The test is conducted with a tensile strength testing machine (Lorentzen & Wettre). For this, samples measuring 15×200 mm are taken from the base paper produced according to Examples 1 to 14 and the polyethylene layer is peeled off them. The peeling force is tested at a peeling speed of 70 mm/min and a peeling angle of 180°.

For comparison, a base paper coated only with polyethylene (without printing ink) was used and the adhesion was also tested on it. The results are listed in Table 3.

TABLE 3

| Test Results | |
|---|---|
| Example | Adhesion (N/15 mm) |
| 1 | 1.30 |
| 2 | 1.03 |
| 3 | 0.99 |
| 4 | 1.03 |
| 5 | 1.15 |
| 6 | 0.97 |
| 7 | 1.11 |
| 8 | 1.15 |
| 9 | 1.40 |
| 10 | 1.11 |
| 11 | 1.17 |
| 12 | 1.17 |
| 13 | 1.40 |
| 14 | 1.20 |
| V1 | 0.80 |
| V2 | 0.33 |
| Comparison (paper without ink) | 1.00 |

We claim:

1. A polyolefin-coated photographic base paper comprising a raw paper having a front side and a back side, the back side of the raw paper being printed with a printing ink which contains an interference pigment and a water-soluble and/or a water-dispersible binder, and wherein the front side and the printed back side of the raw paper are coated with the polyolefin.

2. The base paper according to claim 1, wherein the interference pigment is a mica-based pigment, in which the mica particles are coated with an inorganic oxide.

3. The base paper according to claim 2, wherein the mica particles are coated with an oxide selected from the group consisting of $TiO_2$, $Fe_2O_3$ or both.

4. The base paper according to claim 1, wherein the interference pigment is used in combination with translucent ink pigments.

5. The base paper according to claim 1, wherein the binder is selected from the group consisting of an acrylate copolymer, a styrene/butadiene copolymer, polyvinyl alcohol, polyvinyl pyrrolidone or a mixture thereof.

6. The base paper according to claim 5, wherein the binder is a polyvinyl alcohol.

7. The base paper according to claim 6, wherein the polyvinyl alcohol is a polyvinyl alcohol with a low and/or medium molecular weight.

8. The base paper according to claim 1, wherein the percentage of interference pigment in the printing ink is 10% to 30% by weight, in relation to the printing ink solution.

9. The base paper according to claim 1, wherein the quantity ratio of pigment/binder is in the range of 1:1 to 8:1.

10. The base paper according to claim 1, wherein the printing ink contains at least one additive.

11. The base paper according to claim 10, wherein said other additive includes a wetting agent.

* * * * *

UNITED STATES PATENT AND TRADEMARK OFFICE

CERTIFICATE OF CORRECTION

PATENT NO. : 6,020,051
DATED : February 1, 2000
INVENTOR(S) : Ebisch et al.

It is certified that error appears in the above-identified patent and that said Letters Patent is hereby corrected as shown below:

Column 1,
Line 24, "fcr tne" should be -- for the --.

Column 3,
Table 2, the first component "Polvinyl alcohol" should be -- Polyvinyl alcohol I --.
After Table 2, the following should be added:

-- Polyvinyl alcohol I: degree of saponification 98%, molecular weight: 23,000 g/mole
Polyvinyl alcohol II: degree of saponification 98%, molecular weight: 35,000 g/mole
Polyvinyl alcohol III: degree of saponification 97%, molecular weight: 48,000 g/mole
Pigment I: mica particles modified with anatase, 5 to 20 μm
Pigment II: mica particles with Fe-oxide coating, 10 to 40 μm
Pigment III: mica particles with anatase and Fe-oxide coating, 10 to 60 μm --.

Signed and Sealed this

Twentieth Day of August, 2002

*Attest:*

JAMES E. ROGAN

*Attesting Officer* *Director of the United States Patent and Trademark Office*